US012387053B2

United States Patent
Yuan et al.

(10) Patent No.: US 12,387,053 B2
(45) Date of Patent: Aug. 12, 2025

(54) LARGE-SCALE TEXT DATA ENCODING AND COMPRESSION

(71) Applicant: International Business Machines Corporation, Armonk, NY (US)

(72) Inventors: Zhong Fang Yuan, Xi'an (CN); Tong Liu, Xi'an (CN); Wen Wang, Beijing (CN); Chen Gao, Xi'an (CN); Xiang Yu Yang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 711 days.

(21) Appl. No.: 17/585,619

(22) Filed: Jan. 27, 2022

(65) Prior Publication Data

US 2023/0237278 A1 Jul. 27, 2023

(51) Int. Cl.
*G06F 40/10* (2020.01)
*G06F 40/205* (2020.01)
*G06F 40/40* (2020.01)

(52) U.S. Cl.
CPC ............ *G06F 40/40* (2020.01); *G06F 40/205* (2020.01)

(58) Field of Classification Search
CPC ...... G06F 40/30; G06F 40/284; G06F 40/216; G06F 40/20; G06F 16/3344; G06F 40/205; G06F 40/289; G06F 40/211
See application file for complete search history.

(56) References Cited

U.S. PATENT DOCUMENTS

| 5,793,869 | A | 8/1998 | Claflin, Jr. |
| 8,775,805 | B2 | 7/2014 | von Mueller et al. |
| 10,229,111 | B1 | 3/2019 | Filippova et al. |
| 12,045,272 | B2 * | 7/2024 | Mahapatra ............... G06N 3/08 |
| 2019/0018933 | A1 * | 1/2019 | Oono ...................... G06N 3/045 |
| 2020/0042547 | A1 * | 2/2020 | Prakash ................. G06N 3/082 |
| 2021/0117617 | A1 * | 4/2021 | Blaya ..................... G06N 20/00 |
| 2021/0374338 | A1 * | 12/2021 | Shrivastava ............ G06F 40/30 |
| 2022/0067529 | A1 * | 3/2022 | Wagner .................. G06N 3/084 |
| 2022/0318255 | A1 * | 10/2022 | Fei ..................... G06F 16/24578 |

(Continued)

FOREIGN PATENT DOCUMENTS

| CN | 112395891 A |   | 2/2021 |
| CN | 117827111 A | * | 4/2024 |
| WO | 2021/074272 A1 |   | 4/2021 |

OTHER PUBLICATIONS

Fevry et al., "Unsupervised sentence compression using denoising auto-encoders", 2018, arXiv preprint arXiv:1809.02669. Sep. 7, 2018. (Year: 2018).*

(Continued)

*Primary Examiner* — Olujimi A Adesanya
(74) *Attorney, Agent, or Firm* — Steven M. Bouknight

(57) ABSTRACT

Embodiments of the present invention provide an approach for compressing data, and more particularly, to large-scale text data encoding and compression using absolute overfitting on pre-trained language models. Large-scale data is parsed into sentences. A unique token is generated for each sentence to form a token list. A generative (or compression) model is trained from the tokens in the token list to produce the corresponding sentence of each token through absolute overfitting of a pre-trained language model. The compressed text data is stored as the token list and generative model, resulting in a storage space savings.

20 Claims, 5 Drawing Sheets

(56) References Cited

U.S. PATENT DOCUMENTS

2022/0343076 A1* 10/2022 Saito .................. G06N 3/02
2022/0405461 A1* 12/2022 Lempel ............... H03M 7/3084
2023/0020886 A1* 1/2023 Mahapatra ............ G06N 3/08

OTHER PUBLICATIONS

Hermansson, "Using pre-trained language models for extractive text summarisation of academic papers", 2020, Master's Thesis, pp. 1-95 (Year: 2020).*

Fan et al "Controllable abstractive summarization", 2017, arXiv preprint arXiv:1711.05217. Nov. 14, 2017. (Year: 2017).*

Kikuchi et al, "Controlling output length in neural encoder-decoders", 2016, arXiv preprint arXiv:1609.09552. Sep. 30, 2016. (Year: 2016).*

Weiwei Hou et al., "A Token-wise CNN-based Method for Sentence Compression", International Conference on Neural Information Processing 2020, Published Nov. 19, 2020, 12 pages.

* cited by examiner

LARGE-SCALE TEXT DATA ENCODING AND COMPRESSION

The present invention relates generally to data compression, and more particularly, to large-scale text data encoding and compression using absolute overfitting on pre-trained language models.

BACKGROUND

In computing systems, data compression is a process in which the size of a file is reduced by re-encoding the file data to use fewer bits of storage than the original file. Encoding is often used for maintaining data usability and can be reversed by employing the same algorithm that encoded the content, (i.e., no key is used). A fundamental component of data compression is that the original file can be transferred or stored, recreated, and then used later with a process called decompression.

Data compression can be done by a program that uses functions or an algorithm to effectively discover how to reduce the size of the data. For example, an algorithm might represent a string of bits with a smaller string of bits by using a "reference dictionary" for conversion between them. Another example involves a formula that inserts a reference or pointer to a string of data that the program has already seen. A good example of this can occur with image compression. When a sequence of colors, like "blue, red, red, blue" is found throughout the image, the formula can turn this data string into a single bit, while still maintaining the underlying information.

Text compression can usually succeed by removing all unnecessary characters, instead inserting a single character as reference for a string of repeated characters, then replacing a smaller bit string for a more common bit string. With proper techniques, data compression can effectively lower a text file by 50% or more, greatly reducing its overall size.

SUMMARY

Embodiments of the present invention provide an approach for compressing data, and more particularly, to large-scale text data encoding and compression using absolute overfitting on pre-trained language models. Large-scale data is parsed into sentences. A unique token is generated for each sentence to form a token list. A generative (or compression) model is trained from the tokens in the token list to produce the corresponding sentence of each token through absolute overfitting of a pre-trained language model. The compressed text data is stored as the token list and generative model, resulting in a storage space savings.

One aspect of the present invention includes a computer-implemented method for encoding and compressing text, comprising the computer-implemented steps of: parsing received text data to be compressed into a set of sentences; generating a unique token for each sentence among the set of sentences to form a token list; training, using each token within the token list, a generative model to produce the corresponding sentence of each token through absolute overfitting of a pre-trained language model; and storing the generative model and token list, wherein the generative model and token list represent the compressed text data.

A second aspect of the present invention provides a system for encoding and compressing text, comprising: a memory medium comprising program instructions; a bus coupled to the memory medium; and a processor, for executing the program instructions, coupled to the memory medium that when executing the program instructions causes the system to: parse received text data to be compressed into a set of sentences; generate a unique token for each sentence among the set of sentences to form a token list; train, using each token within the token list, a generative model to produce the corresponding sentence of each token through absolute overfitting of a pre-trained language model; and store the generative model and token list, wherein the generative model and token list represent the compressed text data.

A third aspect of the present invention provides a computer program product for encoding and compressing text data, the computer program product comprising a computer readable storage device, and program instructions stored on the computer readable storage device, to: parse received text data to be compressed into a set of sentences; generate a unique token for each sentence among the set of sentences to form a token list; train, using each token within the token list, a generative model to produce the corresponding sentence of each token through absolute overfitting of a pre-trained language model; and store the generative model and token list, wherein the generative model and token list represent the compressed text data.

BRIEF DESCRIPTION OF THE DRAWINGS

These and other features of this invention will be more readily understood from the following detailed description of the various aspects of the invention taken in conjunction with the accompanying drawings in which.

Figure 1:
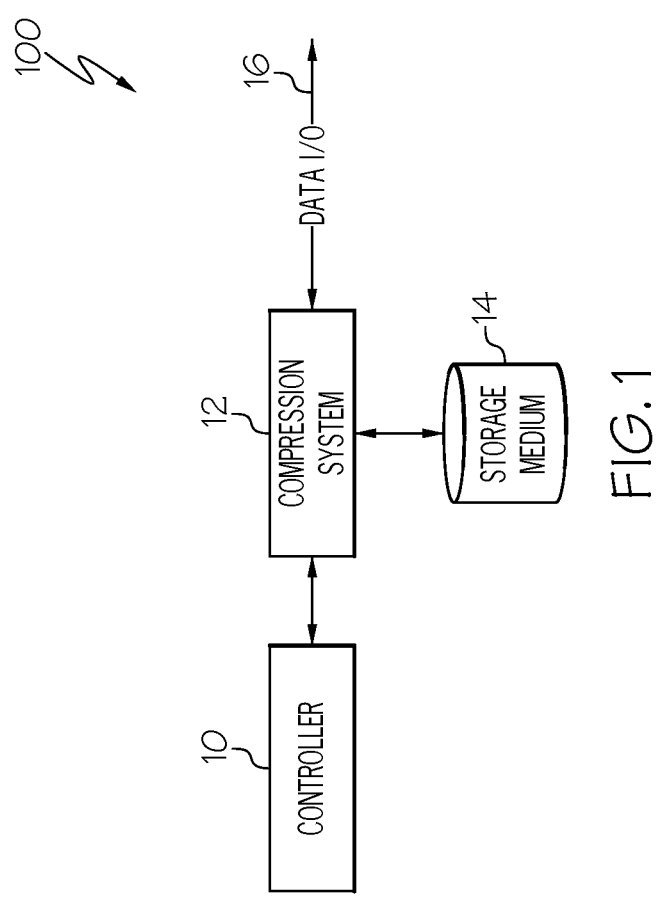
FIG. 1 is a high-level block diagram of a system for providing large-scale data compression according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the embodiments set forth herein. Rather, these illustrative embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Furthermore, the term "developer" refers to any person who writes computer software. The term can refer to a specialist in one area of computer programming or to a generalist who writes code for many kinds of software.

As indicated above, embodiments of the present invention provide an approach for compressing data, and more particularly, to large-scale text data encoding and compression using absolute overfitting on pre-trained language models. Large-scale data is parsed into sentences. A unique token is generated for each sentence to form a token list. A generative (or compression) model is trained from the tokens in the token list to produce the corresponding sentence of each token through absolute overfitting of a pre-trained language model. The compressed text data is stored as the token list and generative model, resulting in a storage space savings.

Advancements in natural language processing (NLP) techniques have given rise to innovative model architectures like BERT and GPT-3. BERT stands for Bidirectional Encoder Representations from Transformers and is a language representation model. It uses two steps, pre-training and fine-tuning, to create state-of-the-art models for a wide range of tasks. Its distinctive feature is the unified architecture across different downstream tasks. That means that the same pre-trained model can be fine-tuned for a variety of final tasks that might not be similar to the task the model was trained on and give close to state-of-the-art results. GPT-3, or the third generation Generative Pre-trained Transformer, is a neural network machine learning model trained using internet data to generate any type of text. It requires a small amount of input text to generate large volumes of relevant and sophisticated machine-generated text.

As stated, data compression refers to reducing the amount of data to reduce storage space, thereby improving its transmission, storage and processing efficiency without losing useful information, or reorganizing data according to a certain algorithm to reduce data redundancy and storage space. Overfitting is a phenomenon in which assumptions become excessively strict in order to obtain consistent assumptions. In traditional data compression methods, for text information, it is often necessary to organize the original data in advance with the aid of prior knowledge or manual experience, so that the accuracy of data compression will not be excessively lost.

In the face of this phenomenon, this disclosure proposes a method of encoding and compressing text information by using the overfitting phenomenon on a pre-trained language model (e.g., BERT or GPT-3), which can effectively solve this problem, so that large-scale text data compression can be improved. The pre-trained language model is used as an encoder to establish a mapping from token to text. During training, the focus is on establishing a one-to-one correspondence between each original text sentence and a derived token so that the entire original text can be compressed and decompressed using this derived correspondence. An advantage to this approach involves effectively compressing massive text data with a low rate of data loss.

FIG. 1 shows a high-level block diagram of a system 100 for providing large-scale data compression according to an embodiment of the present invention. In particular, FIG. 1 depicts a host system 10 comprising a controller 10 (e.g., a file management system), a compression/decompression (or data compression) system 12, and a storage medium 14. The controller tracks and monitors the throughput (e.g., data storage and retrieval) of the data compression system 12. In one embodiment, the system throughput that is tracked by the controller 10 preferably comprises a number of pending access requests to the memory system.

The data compression system 12 is operatively connected to the storage medium 14 using suitable protocols to write and read compressed data to and from the storage medium 14. It is to be understood that the storage medium 14 may comprise any form of memory device including all forms of sequential, pseudo-random, and random access storage devices. The storage medium 14 may be volatile or non-volatile in nature, or any combination thereof. Storage medium as known within the current art include all forms of random access memory, magnetic and optical tape, magnetic and optical disks, along with various other forms of solid-state mass storage media. Thus it should be noted that the current invention applies to all forms and manners of storage media including, but not limited to, storage mediums utilizing magnetic, optical, and chemical techniques, or any combination thereof.

The data compression system 12 preferably operates in real-time (or substantially real-time) to compress data to be stored on the storage medium 14 and to decompress data that is retrieved from the storage medium 14. The data compression system 12 may maintain the compressed data to be stored on the storage medium 14 and the decompressed data that is retrieved from the storage medium 14 for subsequent data processing, storage, or transmittal. In addition, the data compression system 12 may receive data (compressed or not compressed) via an I/O (input/output) port 16 that is transmitted over a transmission line or communication channel from a remote location, and then process such data (e.g., decompress or compress the data). The data compression system 12 may further transmit data (compressed or decompressed) via the I/O port 16 to another network device for remote processing or storage.

Figure 2:
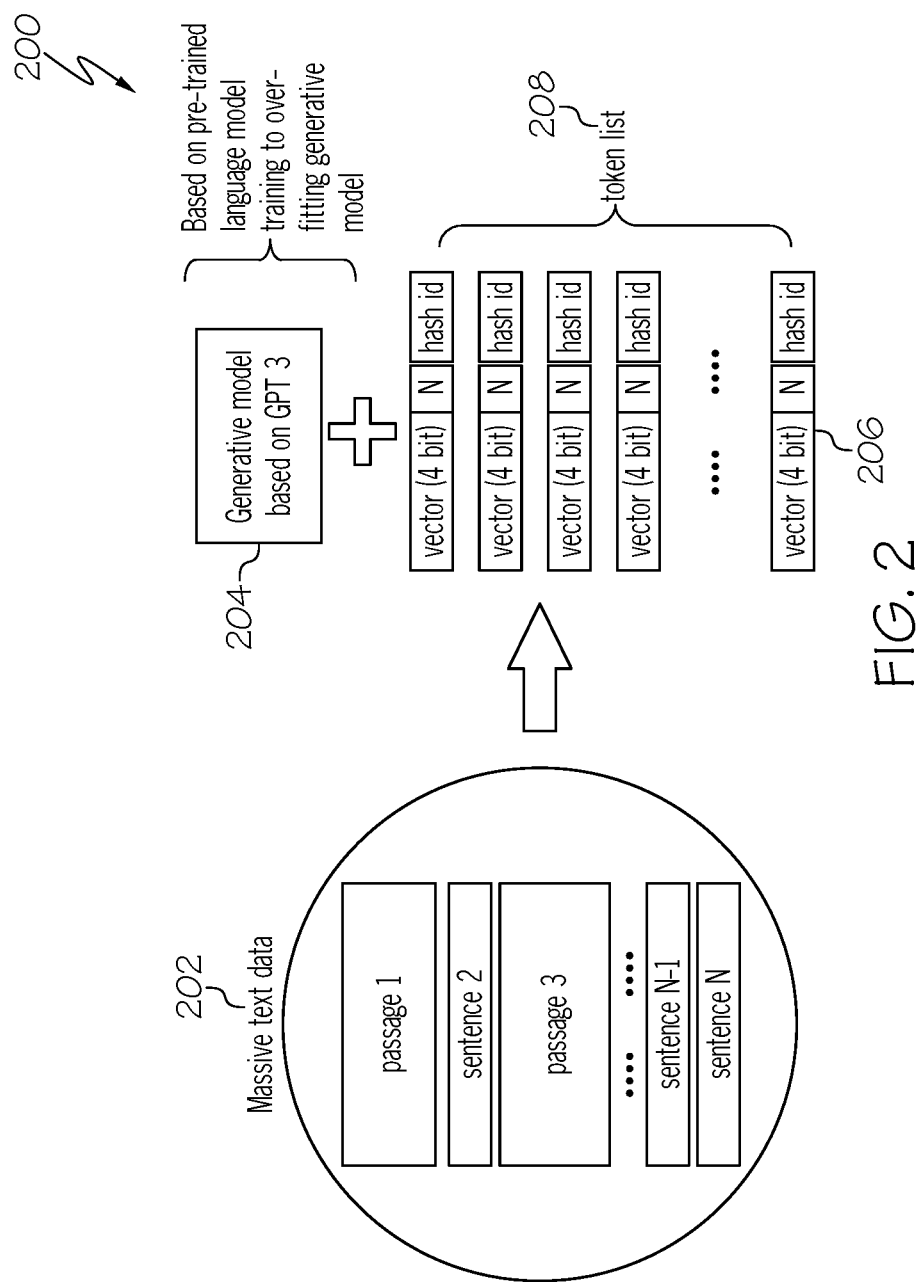
FIG. 2 is a high-level diagram depicting an example use of an overfitting phenomenon on a pre-trained language model to encode and compress large-scale text information according to an embodiment of the present invention.

FIG. 2 shows a high-level diagram 200 depicting an example use of an overfitting phenomenon on a pre-trained language model to encode and compress large-scale text information 202. Characteristics of compressed text features refined by a pre-trained language model and the mechanical stability of a natural language generative model (or information compression model) brought about by model overfitting can be used together to achieve information compression for large-scale texts. In data science, overfitting occurs when a statistical model fits exactly against its training data. Each sentence of text data 202 is converted into a token 206 using generative model 204 to produce token list 208. Token list 208 represents all text data 202 after compression. When decompressing the compressed text data 202, token list 208 can then be transformed back into text data 202 (i.e., decompressed) using generative model 204. The full compression process is discussed in greater detail below.

Figure 3:
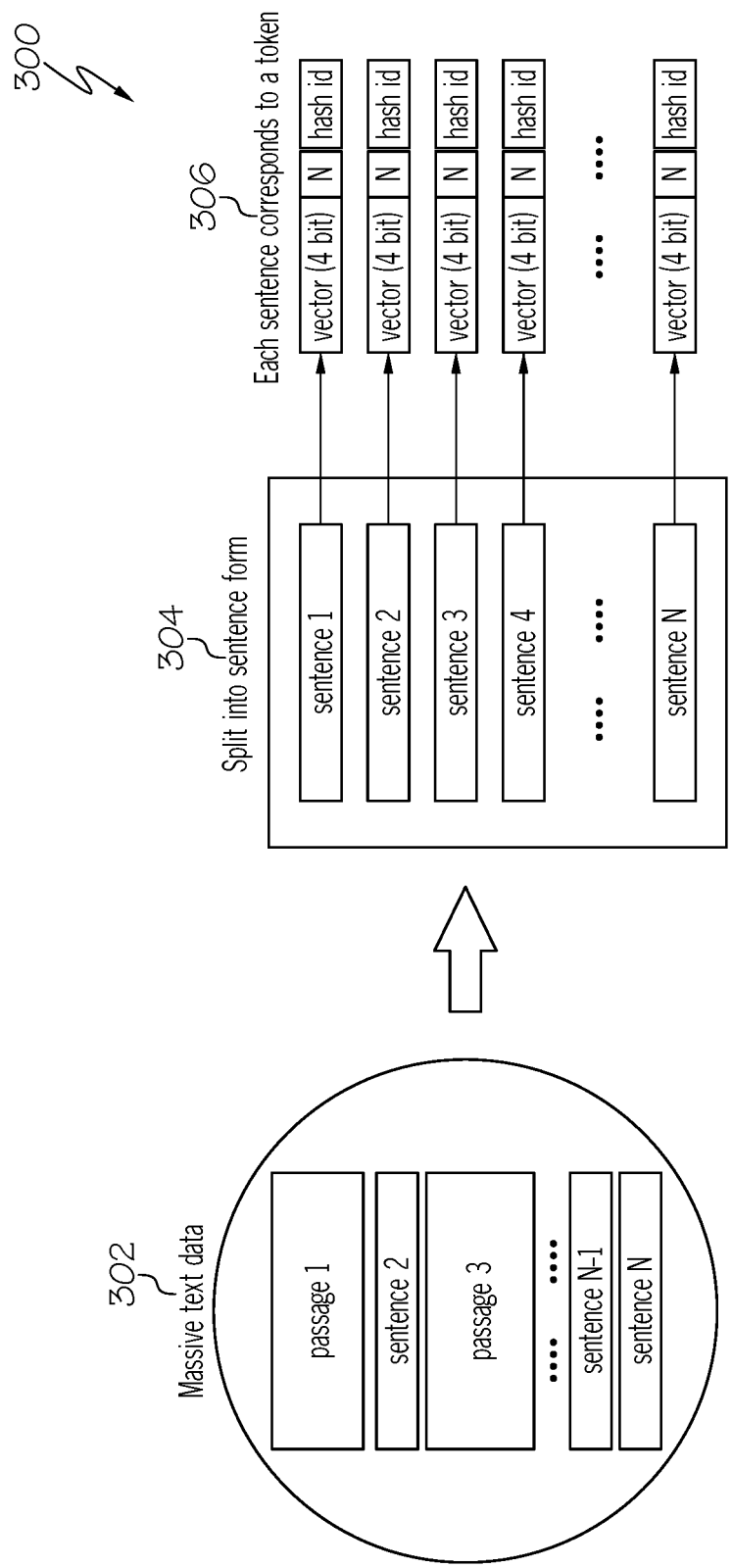
FIG. 3 is a high-level diagram of generating a token list representing compressed data according to an embodiment of the present invention.

FIG. 3 shows a high-level diagram 300 of generating a token list representing compressed text data. As shown, text data 302 to be compressed is first parse into sentence granularity 304 and, for each sentence, a unique token 306 is generated. The generated token is composed of three components. The first component is a 4-digit embedding. Word embedding is the task of mapping words or phrases to a low dimensional numerical vector. In this context, the embedding is a sentence vector of the sentence corresponding to the token after the dimensionality is reduced to 4. The second component is the length of the sentence in words. The third component is a hash identifier marking which large text unit the sentence comes from (e.g., an article). The final token can then be generated. For example, the token "vector n+6+hash@11" can represent the sentence "the weather is good today". The process is repeated until each sentence has been converted into a unique token 306 to form a token list. These three parts can be regarded as the metadata of the compressed text. They uniquely correspond to a piece of original text. The metadata can be used to restore the original text corresponding to this metadata when needed. The technique needed here is the overfitting model that has been trained to a sufficient degree.

Figure 4:
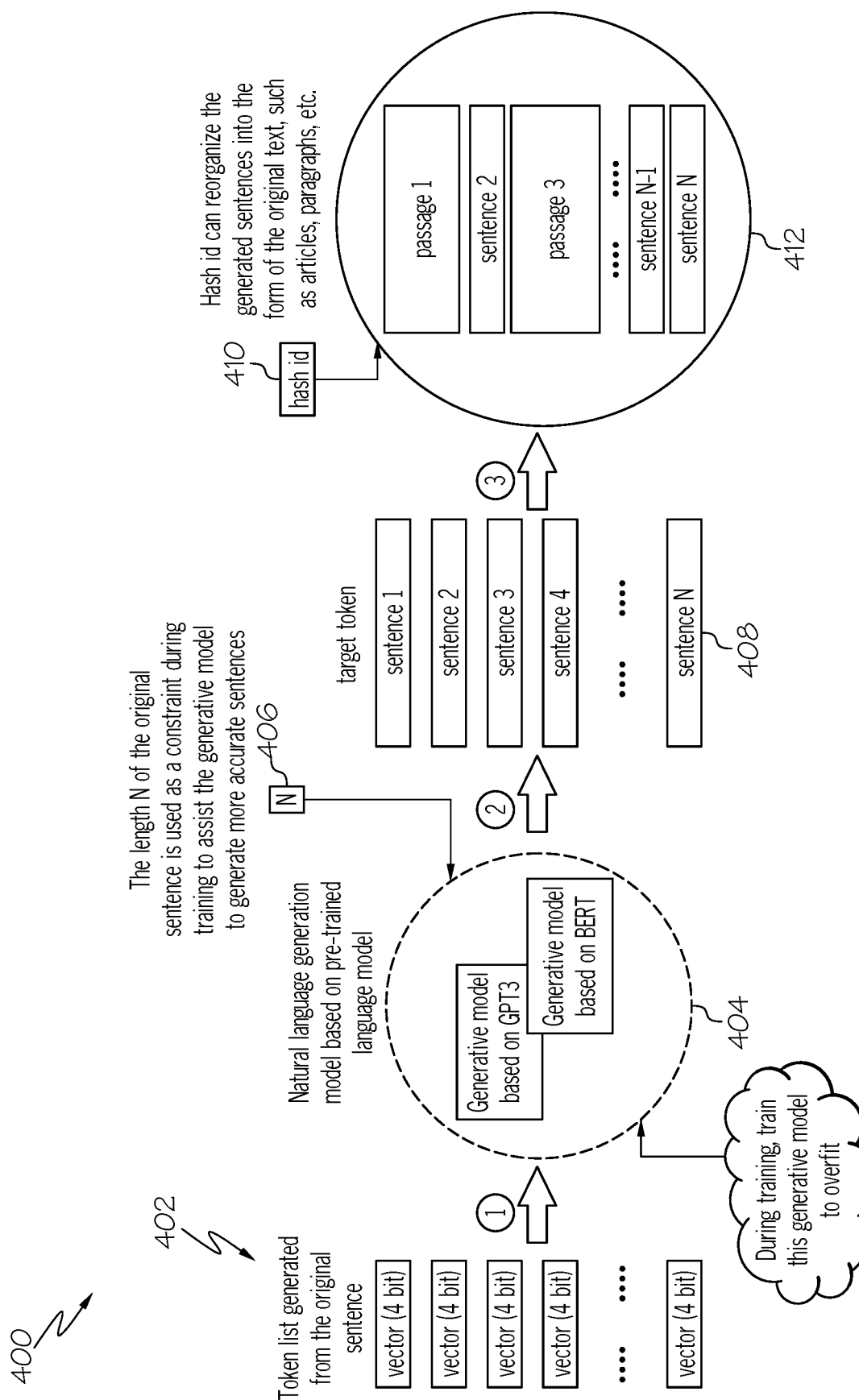
FIG. 4 is a high-level diagram of training a generative model for large-scale data compression to an embodiment of the present invention.

FIG. 4 shows a high-level diagram 400 of training a generative model for large-scale data compression. Each token in token list 402 generated from a sentence of the original text data can be used as an input with the sentence corresponding to the token as the output to train a natural language generative model 404 based on a pre-trained language model (e.g., GPT-3 or BERT). It is worth noting that when training the generative model 404, it is necessary to use overfitting to train the decoder part of the generative model. In other words, the length N 406 in a given token representing the original sentence is used as a constraint during training to assist the generative model 404 to generate a sentence 408 that is exactly the same as the original text corresponding to this token. Each hash identifier 410 contained in each unique token can be used to reorganize the generated sentences to form original text 412 (e.g., articles, paragraphs, etc.). The generative model is fully trained based on the performance of the model in the training set and the test set. When the accuracy of the data in the training set reaches 100%, but the performance in the test set is very poor, it means that the phenomenon of overfitting has occurred and the model have been fully trained.

To further explain, overfitting is used to train the generative model 404 so that each token (representing an original source sentence of the text data) that is input into the model produces an output exactly matching its corresponding original sentence. Again, overfitting is the production of an analysis that corresponds too closely or exactly to a particular set of data, and may therefore fail to fit additional data or predict future observations reliably. However, in this context, it is desirable that generative model 404 generate a sentence 408 exactly matching (i.e., absolute overfitting) the original text corresponding to its input token. This is necessary because when the text data is decompressed it must match exactly to what was compressed. When this series of steps are completed, the original mass data is compressed into a token list+the size of a generative model, and the original data size is greatly reduced. When wanting to decompress the compressed data, the token list input generative model method is used to dynamically restore the original large-scale text data. It is further worth noting that, for efficiency, once a certain number of sentences from various sources have been analyzed and incorporated into the generative model, the generative model can use the information to regenerate any previously coded sentence based on its compression code.

Figure 5:
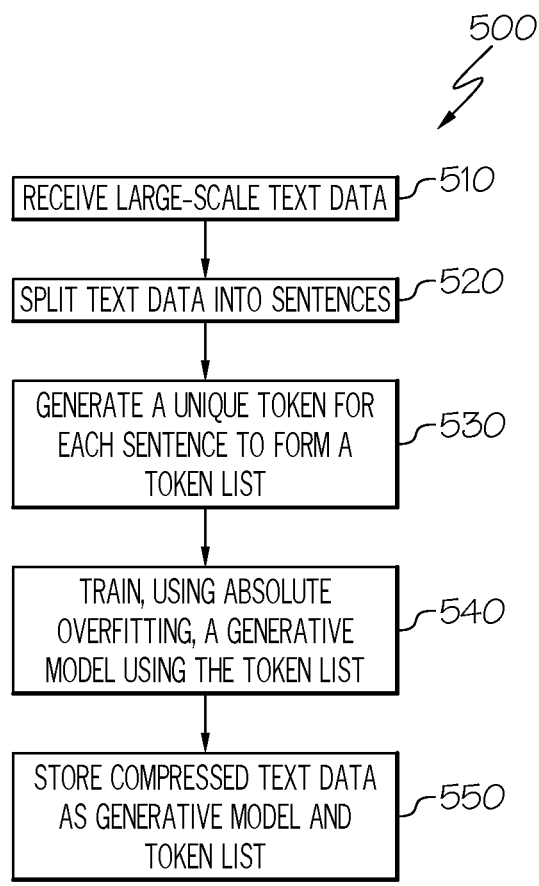
FIG. 5 shows a method flow diagram for large-scale text data compression according to an embodiment of the present invention.

FIG. 5 shows an example method flow diagram 500 of large-scale text data encoding and compression using absolute overfitting on a pre-trained language model. At 510, data compression system (DCS) 12 receives large-scale text data. DCS 12 splits the text data into sentences, at 520. At 530, DCS 12 generates a unique token for each sentence to form a token list. DCS 12 trains a generative model using all the tokens in the token list, at 540. As stated, when training the generative model, it is necessary to use absolute overfitting to train the decoder part of the generative model so that the output generated for a given input token matches the original sentence in the text data that corresponds to that token. This is imperative so that when the text data is decompressed using the token list and generative model, it will match the original text data. At 550, DCS 12 stores the compressed large-scale data as the token list and generative model, resulting in storage space savings. For example, a source text may include terabytes of text. However, after compression using the described method, the source text can be compressed into a token list and a single model. The size of a token list may be only tens of megabytes (MB) and the size of a model may be no more than 2 gigabytes (GB). Using just the token list and model, the terabytes of original text can be restored.

It will be appreciated that the method process flow diagram of FIG. 5 represents possible implementations of a process flow for encoding and compressing text data using absolute overfitting on a pre-trained language model, and that other process flows are possible within the scope of the invention. The method process flow diagrams discussed above illustrate the architecture, functionality, and operation of possible implementations of systems, methods and computer program products according to various embodiments of the present invention. In this regard, each portion of each flowchart may represent a module, segment, or portion of code, which comprises one or more executable instructions for implementing the specified logical function(s). It will also be noted that each block of each flowchart illustration can be implemented by special purpose hardware-based systems that perform the specified functions or acts.

Further, it can be appreciated that the approaches disclosed herein can be used within a computer system for encoding and compressing text data using absolute overfitting on a pre-trained language model. In this case, as shown in FIG. 1, data compression system (DCS) 12 can be provided, and one or more systems for performing the processes described in the invention can be obtained and deployed to DCS 12 (FIG. 1). To this extent, the deployment can comprise one or more of: (1) installing program code on a computing device, such as a computer system, from a computer-readable storage medium; (2) adding one or more computing devices to the infrastructure; and (3) incorporating and/or modifying one or more existing systems of the infrastructure to enable the infrastructure to perform the process actions of the invention.

The exemplary computer system 12 (FIG. 1) may be described in the general context of computer-executable instructions, such as program modules, being executed by a computer. Generally, program modules include routines, programs, people, components, logic, data structures, and so on, which perform particular tasks or implement particular abstract data types. Exemplary computer system 12 may be practiced in distributed computing environments where tasks are performed by remote processing devices that are linked through a communication network. In a distributed computing environment, program modules may be located in both local and remote computer storage media including memory storage devices.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, data compression system 12 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided with this invention an approach for encoding and compressing text data using absolute overfitting on a pre-trained language model. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for encoding and compressing text data, comprising computer-implemented steps of:
    parsing, using a pre-trained language model, received text data to be compressed into a set of sentences;
    generating, using the pre-trained language model, a unique token for each sentence among the set of sentences to form a token list;
    training a generative model using absolute overfitting on the pre-trained language model, wherein the training further comprises training a decoder part of the generative model such that an output generated for a given input that includes the unique token matches an original sentence in the received text data corresponding to the unique token; and
    compressing the received text data using the trained generative model and each unique token within the token list, wherein the compressing further comprises using the trained generative model to produce a corresponding sentence of each unique token through the absolute overfitting of the pre-trained language model, wherein a combination of the token list and the trained generative model that is based on the absolute overfitting of the pre-trained language model represent the compressed text data.

2. The computer-implemented method of claim 1, wherein the unique token includes an embedding, a length of the corresponding sentence, and a hash identifier.

3. The computer-implemented method of claim 1, wherein the pre-trained language model is a Generative Pre-trained Transformer 3 (GPT-3) or Bidirectional Encoder Representations from Transformers (BERT) model.

4. The computer-implemented method of claim 1, wherein training the generative model further comprises using the unique token within the token list as input to produce the output and ensuring, using a length of the corresponding sentence stored in the unique token as a constraint, the output exactly matches a text of the corresponding sentence.

5. The computer-implemented method of claim 1, further comprising decompressing each sentence in the text data using the trained generative model and the token list.

6. The computer-implemented method of claim 5, further comprising organizing, using a hash identifier of each unique token in the token list, the decompressed sentences in an exact order of the received text data, wherein the hash identifier of each unique token references a text unit of the corresponding sentence.

7. The computer-implemented method of claim 2, wherein the embedding of the unique token includes a sentence vector of the sentence corresponding to the token.

8. A system for encoding and compressing text data, comprising:
    a memory medium comprising program instructions;
    a bus coupled to the memory medium; and
    a processor, for executing the program instructions, coupled to the memory medium that when executing the program instructions causes the system to:
    parse, using a pre-trained language model, received text data to be compressed into a set of sentences;
    generate, using the pre-trained language model, a unique token for each sentence among the set of sentences to form a token list;
    train a generative model using absolute overfitting on the pre-trained language model, wherein the training further comprises training a decoder part of the generative model such that an output generated for a given input that includes the unique token matches an original sentence in the received text data corresponding to the unique token; and
    compress the received text data using the trained generative model and each unique token within the token list, wherein the compressing further comprises using the trained generative model to produce a corresponding sentence of each unique token through the absolute overfitting of the pre-trained language model, wherein a combination of the token list and the trained generative model that is based on the absolute overfitting of the pre-trained language model represent the compressed text data.

9. The system of claim 8, wherein the unique token includes an embedding, a length of the corresponding sentence, and a hash identifier.

10. The system of claim 8, wherein the pre-trained language model is a Generative Pre-trained Transformer 3 (GPT-3) or Bidirectional Encoder Representations from Transformers (BERT) model.

11. The system of claim 8, the memory medium further comprising instructions to train the generative model using the unique token within the token list as input to produce the output and ensuring, using a length of the corresponding sentence stored in the unique token as a constraint, the output exactly matches a text of the corresponding sentence.

12. The system of claim 8, the memory medium further comprising instructions to decompress each sentence in the text data using the trained generative model and the token list.

13. The system of claim 12, the memory medium further comprising instructions to organize, using a hash identifier of each unique token in the token list, the decompressed sentences in an exact order of the received text data, wherein the hash identifier of each unique token references a text unit of the corresponding sentence.

14. The system of claim 9, wherein the embedding of the unique token includes a sentence vector of the sentence corresponding to the unique token.

15. A computer program product for encoding and compressing text data, the computer program product comprising a computer readable storage device, and program instructions stored on the computer readable storage device, to:
   parse, using a pre-trained language model, received text data to be compressed into a set of sentences;
   generate, using the pre-trained language model, a unique token for each sentence among the set of sentences to form a token list;
   train a generative model using absolute overfitting on the pre-trained language model, wherein the training further comprises training a decoder part of the generative model such that an output generated for a given input that includes the unique token matches an original sentence in the received text data corresponding to the unique token; and
   compress the received text data using the trained generative model and each unique token within the token list, wherein the compressing further comprises using the trained generative model to produce a corresponding sentence of each unique token through the absolute overfitting of the pre-trained language model, wherein a combination of the token list and the trained generative model that is based on the absolute overfitting of the pre-trained language model represent the compressed text data.

16. The computer program product of claim 15, wherein the unique token includes an embedding, a length of the corresponding sentence, and a hash identifier.

17. The computer program product of claim 15, wherein the pre-trained language model is a Generative Pre-trained Transformer 3 (GPT-3) or Bidirectional Encoder Representations from Transformers (BERT) model.

18. The computer program product of claim 15, further comprising program instructions stored on the computer readable storage device to train the generative model using the unique token within the token list as input to produce the output and ensuring, using a length of the corresponding sentence stored in the unique token as a constraint, the output exactly matches a text of the corresponding sentence.

19. The computer program product of claim 15, further comprising program instructions stored on the computer readable storage device to decompress each sentence in the text data using the trained generative model and the token list.

20. The computer program product of claim 19, further comprising program instructions stored on the computer readable storage device to organize, using a hash identifier of each unique token in the token list, the decompressed sentences in an exact order of the received text data, wherein the hash identifier of each unique token references a text unit of the corresponding sentence.

* * * * *